US005687567A

United States Patent [19]

Hansson et al.

[11] Patent Number: 5,687,567

[45] Date of Patent: Nov. 18, 1997

[54] METHOD AND DEVICE FOR OPERATING A HYDRAULIC TOOL

[75] Inventors: Mikael Hansson, Orsa; Mikael Nilsson, Alvdalen, both of Sweden

[73] Assignee: Pressmaster Tool AB, Alvdalen, Sweden

[21] Appl. No.: 619,588

[22] PCT Filed: Oct. 20, 1994

[86] PCT No.: PCT/SE94/00966

§ 371 Date: May 1, 1996

§ 102(e) Date: May 1, 1996

[87] PCT Pub. No.: WO95/14173

PCT Pub. Date: May 26, 1995

[30] Foreign Application Priority Data

Nov. 18, 1993 [SE] Sweden .................................. 9303824

[51] Int. Cl.[6] .............................................. F16D 31/02

[52] U.S. Cl. .................................. 60/413; 60/431; 60/468

[58] Field of Search ........................ 91/446, 447; 60/413, 60/468, 444, 418, 431

[56] References Cited

U.S. PATENT DOCUMENTS 2,392,471 1/1946 Fox .............................................. 60/51
2,641,106 6/1953 Jelinek .......................................... 60/51
3,375,658 4/1968 Slover ........................................... 60/51
4,096,727 6/1978 Gargaillo .................................. 72/312
4,969,562 11/1990 Saotome ............................... 60/413 X
5,301,505 4/1994 Wright .................................. 60/413 X
5,355,676 10/1994 Inokuchi ................................... 60/413

FOREIGN PATENT DOCUMENTS 3835696 4/1990 Germany .
362691 12/1973 Sweden .

*Primary Examiner*—Hoang Nguyen
*Attorney, Agent, or Firm*—Jacobson, Price, Holman & Stern, PLLC

[57] ABSTRACT

An independent, portable hydraulic unit (80) for powering a hydraulic tool (C), and a method for operating the tool (c) with the aid of the unit. The unit includes a hydraulic circuit (1) having a pump (19) and a power source (17) and a pump motor (18). The pump (19) is intended to pressurize the tool (C) to a first pressure level (P2). The hydraulic circuit charges the hydraulic accumulator (22) to a maximum second pressure level (P1) which is at most equal to the first pressure level (P2). A check valve (31) isolates the hydraulic accumulator (22) from the pump pressure when this pressure exceeds the second pressure level (P1). A closure valve (12) and check valve (21) are provided for enabling the charged accumulator (22) to be connected to the tool upon activation of the unit so as to power the tool. A microprocessor (70) causes the pump (19) to charge the accumulator to the second pressure level while the tool is relieved of pressure, after emptying the accumulator (22). The power unit (80) is controlled so as to isolate the accumulator (22) from the pump after charging the accumulator to the second pressure level (P1). After emptying the accumulator into the took, the pump (19) pressurizes the tool (C) to the first pressure level (P2). The accumulator (22) is charged by the pump (19), while the tool (C) is relieved of pressure and isolated from the pump (19).

5 Claims, 1 Drawing Sheet

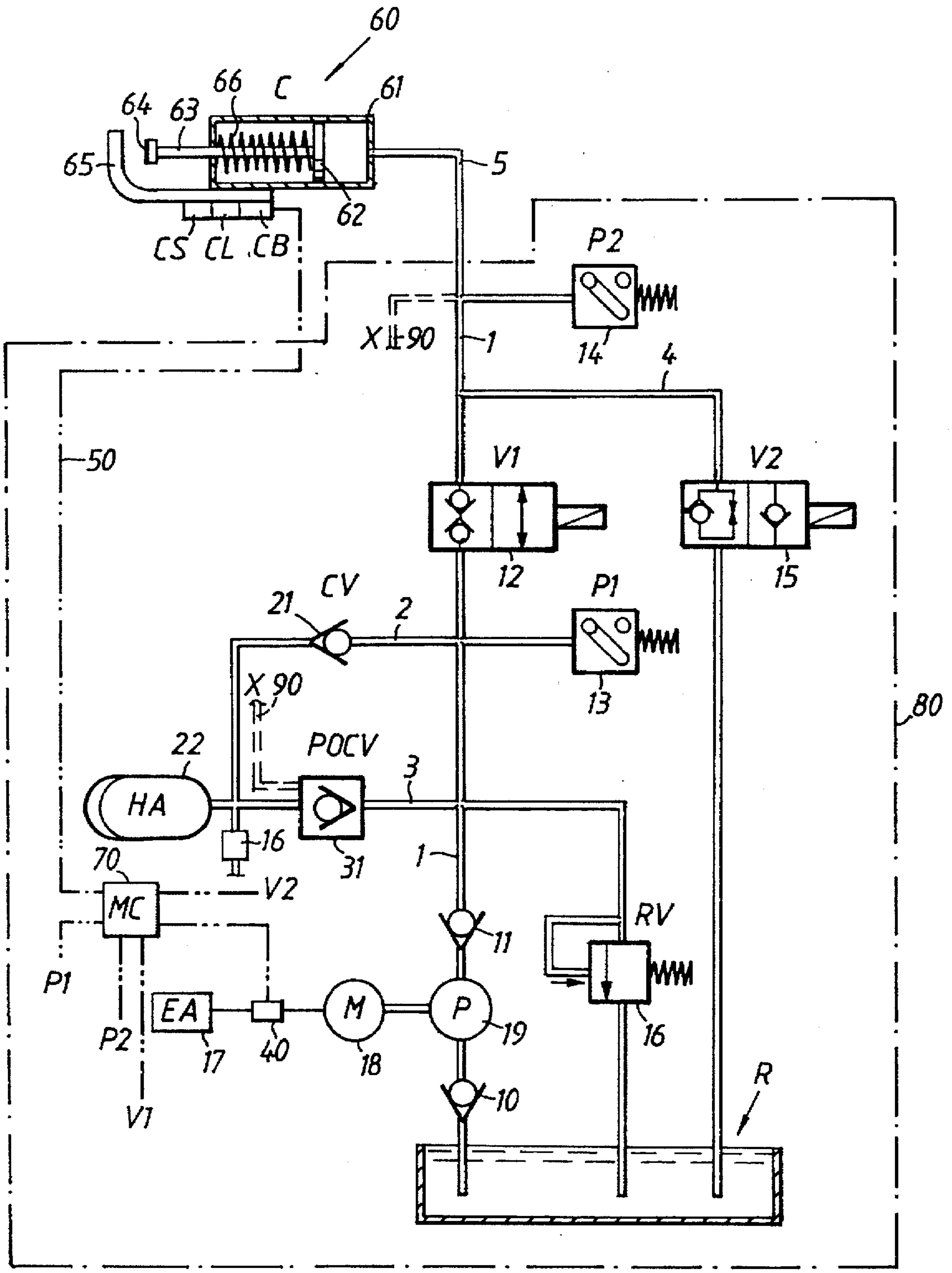
60
66
C
61
64
63
65
5
62
CS
CL
CB
P2
X
90
1
14
4
50
V1
V2
12
15
CV
21
2
P1
13
X 90
80
22
POCV
3
HA
16
31
1
70
MC
V2
RV
11
P1
EA
40
M
P
19
P2
17
18
16
10
V1
R

METHOD AND DEVICE FOR OPERATING A HYDRAULIC TOOL

BACKGROUND OF THE INVENTION

1. Field of the Invention

The present invention relates to a method and to an hydraulic power unit of the kind defined in the respective preambles of the following independent method and apparatus claims.

The invention is concerned more particularly with a portable and "independent" type of hydraulic power unit intended to power a hydraulic tool which is connected to the power unit by means of a hose and handled and manipulated by an operator. The hydraulic tool may have the form of a crimping tool, crimping tongs, for instance.

2. Description of the Related Art

An arrangement of this kind is known from DE-A1-3835696.

Crimping tongs are tools by means of which an electrical end-contact can be pressed onto the end of an electric cable or the like. In industrial applications, such crimping tools may conveniently be hydraulically operated, using an hydraulic piston-cylinder device as the power means. The cylinder is conveniently connected hydraulically to an hydraulic power unit by means of a hydraulic hose, this power unit preferably being portable and also "independent", for many good reasons. By "independent" is meant that the unit will contain its own power source, for instance a rechargeable electric storage battery. The hydraulic power unit will also include an hydraulic circuit having an hydraulic pump which is driven by a motor that can be connected to the power source.

In the case of portable units it is necessary to take into account all significant points of view with regard to the operating functions of the unit. For instance, it is necessary for the pump to generate a relatively high pressure, for instance a pressure of 250 bars or more in order for the working cylinder to produce a required force of 15 kN for instance with the aid of an hydraulic cylinder of reasonable cross-sectional area, this cylinder also preferably forming the tool core or handle.

On the other hand, the pump must be relatively small and relatively light in weight in order for the hydraulic unit to be easily carried by hand, although this will result in a relatively long working cycle.

It is known, for instance, from U.S. Pat. No. 2,392,471, U.S. Pat. No. 2,641,106, U.S. Pat. No. 3,375,658, U.S. Pat. No. 4,096,727 to include in an hydraulic circuit an hydraulic accumulator which is charged by the pump and which provides a relatively large volume flow capable of quickly filling a working cylinder to a working state, as the accumulator is emptied. However, the accumulator pressure falls drastically, therewith resulting in a low accumulator pressure when the working cylinder is in its working state. Furthermore, from the aspect of weight among other things, it is unsuitable to give the accumulator a volume and pressure-durability which will enable the working cylinder to be pressurized from the accumulator at a desired pressure (for instance 250 bars).

It is actually unsuitable to construct the accumulator such as to pressurize the working cylinder with the desired tool working pressure as the accumulator is emptied.

Accordingly, one object oft he invention is to provide a power unit which can include an hydraulic accumulator of relatively low pressure and of relatively small volume, while, at the same time, giving the pump a relatively low flow capacity and low motor power, despite a high pump pressure and a high working pressure of the hydraulic cylinder of the tool. Another object of the invention is to provide a method of operation for one such unit.

These objects are achieved with a power unit having the characteristic features set forth in the independent apparatus claim below, while the inventive method is characterized by the steps set forth in the independent method claim.

Further embodiments of the invention are set forth in the dependent claims.

Fundamentally, the invention requires the hydraulic circuit to include an accumulator which is dimensioned for a pressure which is at most equal to and preferably slightly lower than the maximum pump-working pressure, and which may advantageously be dimensioned for a much lower pressure than the maximum pump-working pressure. When activated, the accumulator fills the tool relatively quickly, so as to bring the tool to a state in which it engages the workpiece. Naturally, the accumulator pressure will fall rapidly as the accumulator is emptied, but the primary aim is to drive the tool quickly to its active state or position, ie into engagement with the workpiece. The accumulator is emptied through a check valve and the hydraulic pump can be activated in conjunction with emptying the hydraulic accumulator or immediately after having emptied the accumulator, wherein the pump pressure is isolated from the accumulator and acts solely on the tool. Since the tool is generally filled with hydraulic fluid and engages the workpiece, the pump need only work to increase the pressure and no to fill the hydraulic cylinder so as to move the moveable part of the tool into contact with the workpiece.

As soon as the pump has applied its maximum working pressure, or established a predetermined high level of pressure against the tool, the tool is isolated from the pump and the pump is caused to fill the accumulator with hydraulic fluid while the tool is emptied of hydraulic fluid and opened to enable another workpiece to be placed in the tool.

Although the maximum pressure level of the accumulator may be equal to the maximum pressure level of the pump, the accumulator maximum pressure may be a slightly lower pressure, preferably a considerably lower pressure level, with the intention of reducing the cost of the accumulator as such.

The accumulator may be protected against overpressure with the aid of a pressure relief valve fitted to the reservoir tank.

BRIEF DESCRIPTION OF THE DRAWINGS

An exemplifying embodiment of the invention will now be described with reference to the accompanying drawing, the single figure of which illustrates generally an hydraulic circuit for an inventive power unit.

DETAILED DESCRIPTION OF THE PREFERRED EMBODIMENTS

As shown in the drawing, the circuit includes a reservoir R and a line 1 which leads from the reservoir R to a hose 5, which is connected, in turn, to a tool C. In the illustrated case, the tool C includes a handle 60 which is formed by a working cylinder 61 having a piston 62 and a piston rod 63. The piston 62 is acted upon, or biassed by a return spring 66 in a direction in which the hydraulic chamber defined between the piston 62 and the cylinder 61 is emptied. A counter pressure surface or anvil 65 is connected to the handle or cylinder 60, wherein a workpiece can be crimped between the anvil 65 and the piston rod 63 or a crimping jaw 64 fitted thereto.

An electric motor 18 is connected operationally to a hydraulic pump 19 in the line 1. Check valves 10 and 11 are mounted in the line 1 on respective sides of the pump 19. An hydraulic accumulator 22 is connected to the line 1 downstream of the pump 19, through the medium of two parallel lines 2, 3. One line, 2, includes a check valve 21 which functions to prevent flow in a direction from the line 1 to the accumulator 22, and the other line, 3, includes a check valve 31 which blocks the flow from the accumulator 22 to the line 1. However, the check valve 31 is not controlled solely by the pressure difference between the line 1 and the accumulator 22, but is also controlled by a pilot pressure from the line 1 downstream of the closure valve 12. The circuit also includes a pressure sensor 14 which senses the pressure in the line 1. A pilot pressure originates from the line 1 at its outlet end and is led to the check valve 31 through a pilot line 90, in order to keep the valve 31 closed when the pressure sensed by the pressure sensor 14 is equal to the pressure in the line 1 on the output side of the pump 19, despite the accumulator 22 holding a lower pressure than the line 1.

As will be seen from the drawing, the illustrated circuit also includes a return line 4 which is connected to the line 1 downstream of the closure valve 12 and which opens into the reservoir R. The line 4 includes a valve 15 in the form of a solenoid valve, which is normally open. Also included is a pressure limiting valve 16 which is connected to the line 1 on the pressure side of the pump 19 and through which hydraulic fluid is drained to the reservoir R when the pressure in the line 1 exceeds a given limit value. A pressure sensor 13 is connected to the line 1 between the pump 19 and the closure valve 12.

An electric storage battery 17 is connected to the motor 18 via a switch 40. The switch 40 is controlled by a microprocessor 70.

The tool C includes an operating switch CB which is connected to the microprocessor 70 by a signal cable 50. The tool C also includes an acoustic signal emitter CS and a light signal emitter CL. The microprocessor senses and monitors the pressure level of the hydraulic accumulator circuit through a pressure sensor 13 which functions to indicate that charging of the hydraulic accumulator 22 is complete and that the accumulator has obtained a given pressure, when sensing a predetermined pressure level. The microprocessor also senses the pressure at the output of line 1, the switched state of the valve 15, and the switched state of the valve 12. The microprocessor 70 also functions to monitor the battery supply voltage of the electrical battery 17 and the temperature of the hydraulic circuit.

Some of the components shown in the drawing have been identified with double reference signs. For instance, the normally closed solenoid valve has been referenced 12 and also V1. Furthermore, the normally open solenoid valve 15 has been referenced 15 and V2. The pressure sensor which produces an output signal when charging of the hydraulic accumulator 22 is complete has been referenced 13 and P1. The pressure sensor 14 which produces an output signal upon completion of a tool working cycle has been referenced 14 and P2. The check valve in the line 2 has been referenced 21 and CV. The pilot-controlled check valve in the line 3 has been referenced 31 and POCV. The pressure limiting valve has been referenced 16 and RV. The microprocessor has been reference 70 and MC. The rechargeable electric storage battery has been referenced 70 and EA, while the pressure accumulator has been referenced 22 and HA.

The portable, independent power system illustrated in the drawing includes generally the tool (C) which is connected freely moveable by the hydraulic hose 5 to an hydraulic power unit which includes the hydraulic circuit illustrated within the square defined by the chain line 80. The hydraulic power unit is controlled by control electronics included in the microprocessor 70.

The illustrated system works as follows:

A main switch (not shown) is switched on and a green lamp (not shown) lights up on the base unit 80. The electronic 70 check the status of the unit 80 with regard to battery voltage and also checks the state of the hydraulic accumulator 22. If the battery voltage 17 is too low, a warning lamp on the base unit lights up and a corresponding warning lamp included in the light signal unit CL on the tool C will also light up. If the pressure prevailing in the hydraulic accumulator circuit does not correspond to the setting on P1, the motor 18 and the pump 19 are set into operation, wherein charging of the accumulator 22 is terminated (the motor 18 and the pump 19 are stopped) when the pressure corresponding to the setting on P1 has ben reached.

A further indicating lamp, for instance a green indicating lamp, included in the arrangement CL on the tool handle may now be switched on and a corresponding acoustic signal may be produced to indicate to the operator that the unit 80 is now ready for use.

The electronics 70 are maintained activated over a period of 10 minutes, to allow the operator to activate an operating button CB on the tool C. If nothing happens within this waiting period, all indicators are extinguished and the arrangement adopts a so-called "sleep mode", in order to save battery energy. The base unit 80 can be restarted by switching the main switch on and off, or by pressing a restart button on the operating handle.

The working cycle is started, by activating the operating button CB. V2 is closed, whereafter V1 is opened. The hydraulic accumulator 22 is emptied into the tool C through the check valve CV. In order to establish the pressure preset at P2, the motor 18 and the pump 19 are started-up when the pressure rises in the control line X/90. The accumulator circuit is blocked by CV and POCV. When the pressure at the outlet of the line 1 corresponds to the setting on the sensor P2, the valve V1 closes and the valve V2 opens so as to evacuate the hydraulic fluid in C to the reservoir tank R. This evacuation of the hydraulic fluid is supported by the tool return springs 66. The working cycle is now terminated.

When the pressure in the accumulator circuit does not correspond to the setting on the pressure sensor P1, the motor 18 and the pump 19 are again started-up. Charging of the accumulator 22 is terminated (the motor 18 and the pump 19 are stopped) when the pressure again corresponds to the pressure setting on the pressure sensor P1. The acoustic and light indicators can now be activated, to indicate that the arrangement is ready for the next working cycle.

The battery voltage, the pressure level of the accumulator circuit and the temperature of the hydraulic circuit are monitored continuously. The arrangement is controlled by a microprocessor through an 8-bit RISC microcontroller. The safety valve or pressure relief valve RV serves only to protect the hydraulic circuit against overpressure.

V1 and V2 are seat valves which provide a good sealing effect. It will be obvious to the person skilled in this art that the valves V1, V2 can be replaced with a 3/2-way valve.

The hydraulic accumulator 22 may be made safe with the aid of a pressure relief valve corresponding to the valve RV/16 which normally discharges to the reservoir tank and which prevents pressurization of the accumulator above its upper pressure limit when this pressure limit is lower than the maximum pump pressure.

One advantage afforded by the invention is that there can be used a small, simple pump which is designed for a relatively high pressure and a relatively small hydraulic flow while still being able to establish rapid primary filling of the tool working cylinder with the aid of an accumulator which need only be designed with respect to the volume requirement of the tool and which in the final stage of an emptying process need only provide a relatively low pressure in the tool, this pressure being sufficient to drive the tool to its closed position, whereafter the tool working pressure is established finally by the pump over a short period of time owing to the tool being filled from the accumulator. A further advantage is obtained because the hydraulic circuit is constructed to enable the accumulator to be charged with hydraulic fluid while the hydraulic fluid in the tool is drained into the reservoir tank (the tool is opened). Still another advantage is afforded by the fact that the accumulator can be chosen for a maximum pressure level which is lower than the pump working pressure, i.e. lower than the maximum pump pressure.

Still another advantage is afforded by the fact that the hydraulic accumulator is emptied into the tool through a first check valve and is charged or replenished from the pump through a controllable second check valve which is guided to a closed state under the (direct) influence of an hydraulic pressure (pilot pressure) applied through the tool supply hose.

We claim:

1. A method for operating an hydraulic tool (C) having an independent, portable hydraulic power unit (80) which includes an hydraulic circuit (1) having a pump (19), a power source (17), a pump-operating motor (18) operable from the power source, and a motor control means (40), wherein the pump (19) is adapted to produce a predetermined first pressure level (P2) for corresponding pressurization of the tool (C), characterized by charging an hydraulic accumulator (22) connected to the hydraulic circuit (1) to a second hydraulic pressure level (P1) which at most is equal to the first pressure level (P2) that can be produced by the pump (19); emptying the charged accumulator (22) into the tool for initial activation thereof, wherein the accumulator is adapted to maintain when empty a pressure level which is considerably lower then the first pressure level; causing the pump (18) to act against the tool filled from the accumulator (22) after emptying of the accumulator, while isolating the accumulator from the pump so as to establish a tool working pressure which corresponds to the first pressure level P2, and thereafter isolating the tool (C) from the pump (19) and emptying the hydraulic fluid content of the tool into the tank (R); and by causing the pump (19), isolated from the tool (C), to charge the accumulator (22) to the second pressure level.

2. A portable independent hydraulic unit (80) for operating an hydraulic tool (C) which can be connected to the unit (80) by means of a hose (5), wherein the unit includes an hydraulic circuit (1) which includes a pump (19), a power source (17) and a pump-operating motor (18) that can be driven by the power source, and a motor-control device (70), and wherein the pump (19) is constructed to produce a predetermined first pressure level (P2) which can be transmitted to the tool (C), characterized in that the hydraulic circuit (1) includes means (31, P2, X) for charging the hydraulic accumulator (22) to a maximum second pressure level (P1) which is at most equal to the first pressure level (P2); in that the means (31, P2, x) include means (31) for isolating the hydraulic accumulator (22) from the pump pressure when said pump pressure exceeds a predetermined maximum pressure level (P1) of the hydraulic accumulator; and in that when activating the unit to pressurize the tool first regulating means (V1, 21) function to first allow the charged accumulator (22) to be connected to the tool (C) for primary activation of the tool; and in that second regulating means (12, 14, 90) function to cause the pump (19) to charge the accumulator (22) to the second pressure level while the tool is isolated from the pump.

3. A unit according to claim 2, characterized in that the isolating means (31) is controlled by the output pressure of the hydraulic circuit (1).

4. A unit according to claim 2, characterized by means (CB, V1, 2, 21) for emptying the accumulator (22) into the tool (C), means (MC, P2) for activating the pump subsequent to emptying the accumulator, so as to increase the hydraulic pressure in the tool (C) to said predetermined first pressure level (P2), means (66, V2) for emptying hydraulic medium from the tool (C) into the tank (R), means (MC, P1, V1) for charging the accumulator (22) to the second pressure level (P1) by operating the pump while the tool (C) is relieved of hydraulic pressure and isolated from the pump (19), and means (P2, X, 31, 3, 2, 21) for isolating the accumulator (22) from the pump (19) when the pump works towards the tool (C).

5. A unit according to claim 2, characterized in that the circuit (1) includes an hydraulic line (1) which extends from the pump to the tool and which includes a closure valve (V1); in that a pressure sensor (P2) is connected to the line (1) between the closure valve (V1) and the tool (C); in that a return line (4) which includes a closure valve (15) and which leads to the tank (R) is connected to the line (1) at a location between the closure valve (12) and the tool (C); in that the hydraulic accumulator (22) is connected by two parallel line (2, 39) to the line (1) between the pump (19) and the closure valve (12); in that one accumulator line (2) includes a first check valve (21) which opens to flow in a direction towards the line (1), and the other accumulator line (3) includes a second check valve (31) which opens to flow in a direction away from the line (1) and towards the accumulator (22); in that the second check valve (31) is adapted to be moved towards a closed position by the pressure in the line (1) between the closure valve (12) and the tool (C) so as to maintain the accumulator (22) isolated from the pump when the pump pressure exceeds the second pressure level; and in that a second pressure sensor (P1) is connected to the line (1) between the closure valve (V1) and the pump (19) so as to enable charging of the accumulator (22) to be interrupted when the second pressure sensor senses the second pressure level (P1), while the pump (19) is maintained isolated from the tool (C) by the closure valve (V1).

* * * * *